United States Patent
D'Ortenzio et al.

(10) Patent No.: US 7,412,099 B2
(45) Date of Patent: Aug. 12, 2008

(54) SYSTEM AND METHOD FOR CONTROLLING COMPRESSION RATIO AND IMAGE QUALITY OF BINARY IMAGES

(75) Inventors: Remo J. D'Ortenzio, Rochester, NY (US); Elizabeth D. Wayman, Ontario, NY (US)

(73) Assignee: Xerox Corporation, Stamford, CT (US)

(*) Notice: Subject to any disclaimer, the term of this patent is extended or adjusted under 35 U.S.C. 154(b) by 1060 days.

(21) Appl. No.: 10/757,344

(22) Filed: Jan. 14, 2004

(65) Prior Publication Data

US 2005/0152607 A1 Jul. 14, 2005

(51) Int. Cl.
*G06K 9/36* (2006.01)

(52) U.S. Cl. .................. 382/232; 382/233; 382/240; 382/246; 382/235; 358/1.9

(58) Field of Classification Search ............. 382/232, 382/233, 240, 245–246, 235, 243; 358/1.2, 358/1.9
See application file for complete search history.

(56) References Cited

U.S. PATENT DOCUMENTS

| | | | | | |
|---|---|---|---|---|---|
| 4,229,768 | A | * | 10/1980 | Kurahayashi et al. | 382/235 |
| 4,288,816 | A | * | 9/1981 | Kashioka et al. | 382/232 |
| 5,650,858 | A | * | 7/1997 | Lund | 358/3.15 |
| 5,966,467 | A | | 10/1999 | Davies | |
| 6,341,178 | B1 | * | 1/2002 | Parker | 382/243 |
| 6,816,628 | B1 | * | 11/2004 | Sarachik et al. | 382/285 |
| 2003/0041281 | A1 | * | 2/2003 | Nestor | 714/5 |

\* cited by examiner

*Primary Examiner*—Matthew C. Bella
*Assistant Examiner*—Ali Bayat
(74) *Attorney, Agent, or Firm*—Gunner G. Leinberg; Nixon Peabody LLP

(57) ABSTRACT

A method, system and computer-readable medium for achieving a target compression ratio for binary images with a minimum of image degradation. Portions of the binary image are strategically replicated and used to replace adjacent portions of the image. This process is continued until a compressed version of the image data satisfies a target compression ratio.

14 Claims, 8 Drawing Sheets

US 7,412,099 B2

SYSTEM AND METHOD FOR CONTROLLING COMPRESSION RATIO AND IMAGE QUALITY OF BINARY IMAGES

FIELD

This invention is related to data compression methods and systems and, more particularly, to methods and systems for controlling compression ratios and image quality of binary images.

BACKGROUND

Typically, digital image compression techniques are characterized as lossless or lossy. When an image's data file is losslessly compressed, its subsequent decompression produces a data file that is identical to the original. In lossy compression, the original and the decompressed file differ, but the differences may be acceptable if the essence or perceived visual quality of the decompressed image file is retained. When compressing a data file, a target compression ratio is often sought in order to produce a compressed file of manageable size. The compression ratio is the ratio of the size of the compressed data file before compression to the size of the data file after compression.

Data compression techniques are frequently used to compress either digital continuous tone images or binary images. Continuous tone images are images that have a virtually unlimited range of color or shades of gray. Binary images are black and white images that lack any shades of gray. Binary images use one bit to represent an image pixel. A pixel, also known as a picture element, is generally understood to be the smallest unit of an image that a particular image generation device can produce, store, or transmit. Many image output devices, such as digital printers, monochrome facsimile devices or raster image processors represent images in binary format.

The concept of introducing loss in continuous tone color images is well documented in the literature. One well-known example is the image compression standard for continuous tone still images developed by JPEG (Joint Photographic Experts Group). Another example is the Wavelets algorithm. These, and others known techniques, define lossy image compression approaches that can be "tuned" to provide a wide range of tradeoffs between image quality and compression ratio.

For binary images, various well-known compression approaches exist such as those defined by CCITT, Lempel-Ziv and Deflate. However, these lossless methods often cannot provide adequate compression ratios for meeting the real-time bandwidths required to drive many high-speed printers and other electronic devices.

SUMMARY

A method and a program storage device readable by a machine and tangibly embodying a program of instructions executable by the machine in accordance with embodiments of the present invention includes replacing at least one portion of binary image data with at least one other portion of the binary image data, compressing the binary image data, and then determining whether the compressed binary image data with at least one replaced portion satisfies a target compression ratio.

A system in accordance with embodiments of the present invention includes a replacement system that replaces at least one portion of binary image data with at least one other portion of the binary image data, a compression system that compresses the binary image data, and an assessment system that determines whether a compressed version of the image with at least one replaced portion satisfies a target compression ratio.

The present invention enables the gradual introduction of loss into binary images to achieve improved compression ratios while minimizing the resulting degradation of image quality. The invention may be used in various applications requiring or benefiting from data compression. Such applications may be found as part of an overall image processing system or in stand-alone applications. This technique has been implemented for compression of binary image data, but may be implemented with other kinds of data files. The present invention allows multiple compression attempts, if necessary, to achieve the desired target compression ratio.

By altering as little data as possible, the present invention allows the compression target to be met with a minimum of image quality degradation. In order to minimize image degradation, the present invention provides techniques for altering the image in sequential steps or "passes". A technique may comprise sequential passes of a bit-sampling and replication function, where each succeeding pass modifies more data until the target compression ratio is achieved. Other techniques include operating on larger or smaller segments of data in order to vary the aggressiveness of the operation, operating on segments in different directions of the image, and using varying rates of bit-sampling and replication. The present invention provides a significant advantage by allowing a target compression ratio to be met with a minimum of image quality degradation.

DETAILED DESCRIPTION

A system 10 and method for achieving target compression ratios in a binary image in accordance with embodiments of the present invention is illustrated in FIGS. 1-8. The system 10 includes a computer 12 coupled with a scanner 24 and a printer 26, although the system 10 can comprise other numbers and types of components in other configurations. The method describes strategically replicating selected portions of a binary image until a target compression ratio for the image is achieved. The present invention provides a number of advantages including achieving an improved compression ratio for a binary image while minimizing the resulting degradation of image quality.

Figure 1:
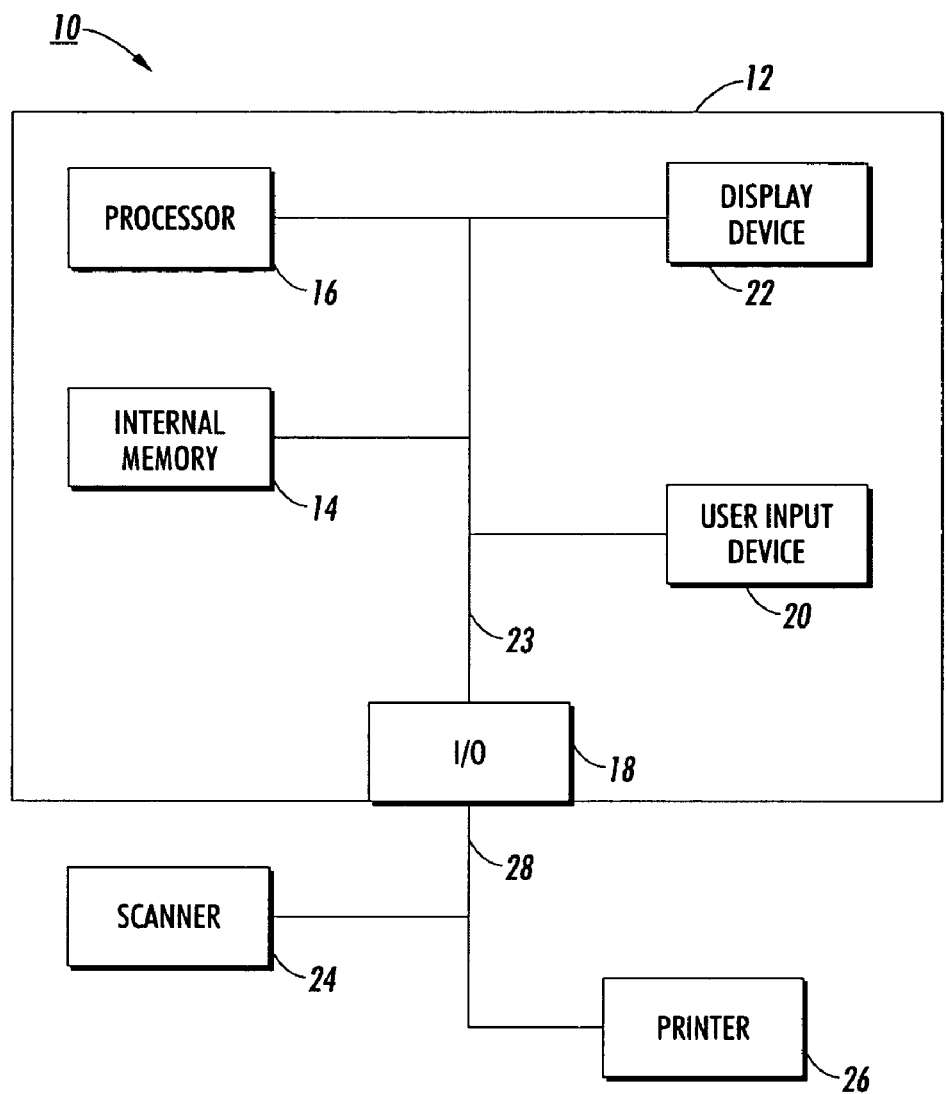
FIG. 1 is a block diagram of a system for selective bit-sampling and replication of binary images in accordance with embodiments of the present invention.

Referring to FIG. 1, the system 10 includes a computer 12 with memory 14, a processor 16, an I/O unit 18, user input devices 20, and a display device 22, which are coupled together by a bus 23 or other link, although computer 12 can comprise other types and numbers of components in other configurations, and other types of processing systems can be used for computer 12. The memory 14 stores instructions and data for performing one or more aspects of the present invention, as described herein including the methods described with references to FIGS. 1-8, although some or all of these instructions and data may be stored elsewhere, such as at a server. A variety of different types of memory storage devices, such as a random access memory (RAM) or a read only memory (ROM) in the system or a floppy disk, hard disk, or CD ROM which is read from and/or written to by a magnetic or optical reading and/or writing system that is coupled to the processor 16, can be used for memory 14 to store these programmed instructions, as well as other information in memory 14.

The display device 22 displays information for the operator of the system 10, such as the status of a compressed binary image. A variety of different types of display devices can be used for display device 22, such as a monitor, printer, or any other type of device that can convey information to the user.

The user input device 20 enables an operator to generate and transmit signals or commands to the system 10, such as the target compression ratio. The target compression ratio is selected based on buffer sizes within the computer 12, although other types of processing systems can be used for the computer 12. A variety of different types of user input devices can be used, such as a keyboard, computer mouse, or any other user input device which provides a mechanism for a user or operator to enter information into the computer 12.

The computer 12 is coupled to a scanner 24 and a printer 26 by one or more buses 28, although other coupling techniques and other types and numbers of components may be coupled to computer 12. A variety of communication systems and/or methods can be used by the input/output interface system 18 to operatively couple and communicate between the computer 12 and the printer 26, and, scanner 24, including a direct connection, a local area network, a wide area network, the world wide web, modems and phone lines, or wireless communication technology each having communications protocols. The scanner 24 comprises a device that can move a finely focused beam of light or electrons in a systematic pattern over a surface in order to reproduce or sense and subsequently transmit an image. The printer 26 comprises a printing device that can render graphical and/or textual representations on a printing medium. Although a scanner 24 and a printer 26 are shown, other types and numbers of devices can be used. The scanner 24 and printer 26 are coupled to the computer 12 at a port in the I/O unit 18 using a line-based medium 28, although wireless mediums may be used. Since devices such as printers and scanners are well known in the art, their specific elements, and their operation will not be described in detail here.

Binary images in the form of data files are retrieved from the scanner 24 or a similar device, such as a server, by the computer 12 so that they may be compressed. After compression by the computer 12, the compressed binary images are then relayed to the printer 26 for printing. The binary images may be relayed to other devices after compression as well.

Figure 2:
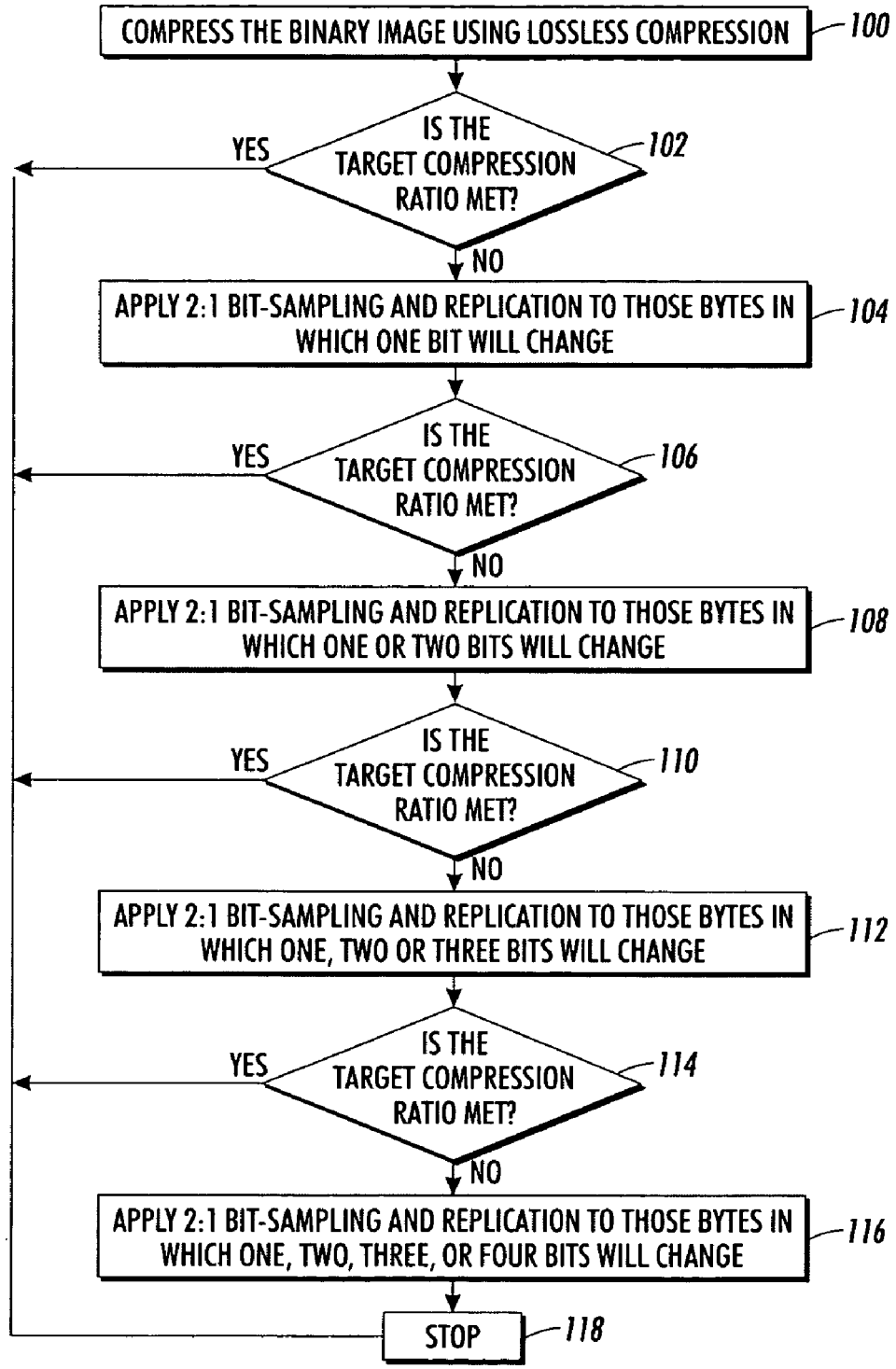
FIG. 2 is a flow chart of a method for selective bit-sampling and replication on selected bytes of a binary image using multiple passes in the fast scan direction in accordance with embodiments of the present invention.
Figure 3:
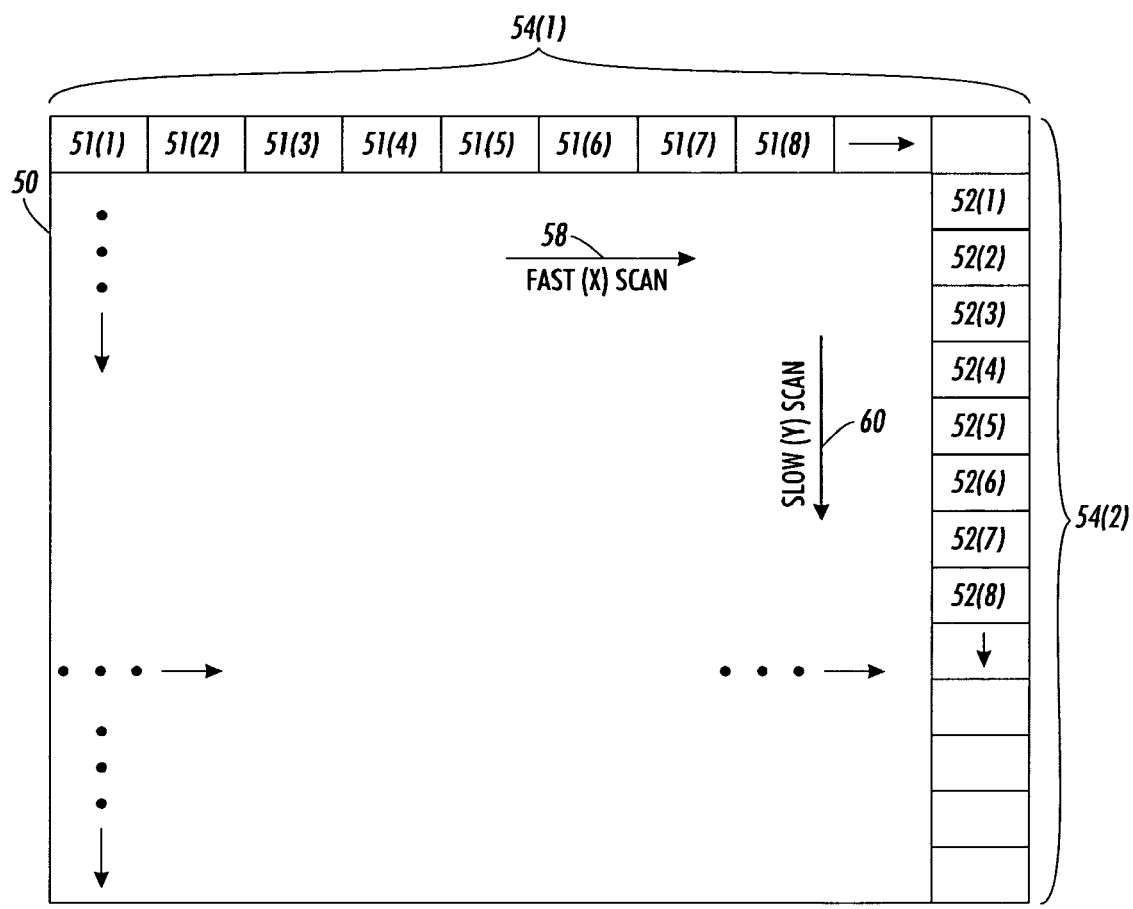
FIG. 3 illustrates the relationship between scan lines and bytes in the fast scan and slow scan directions.
Figure 4:
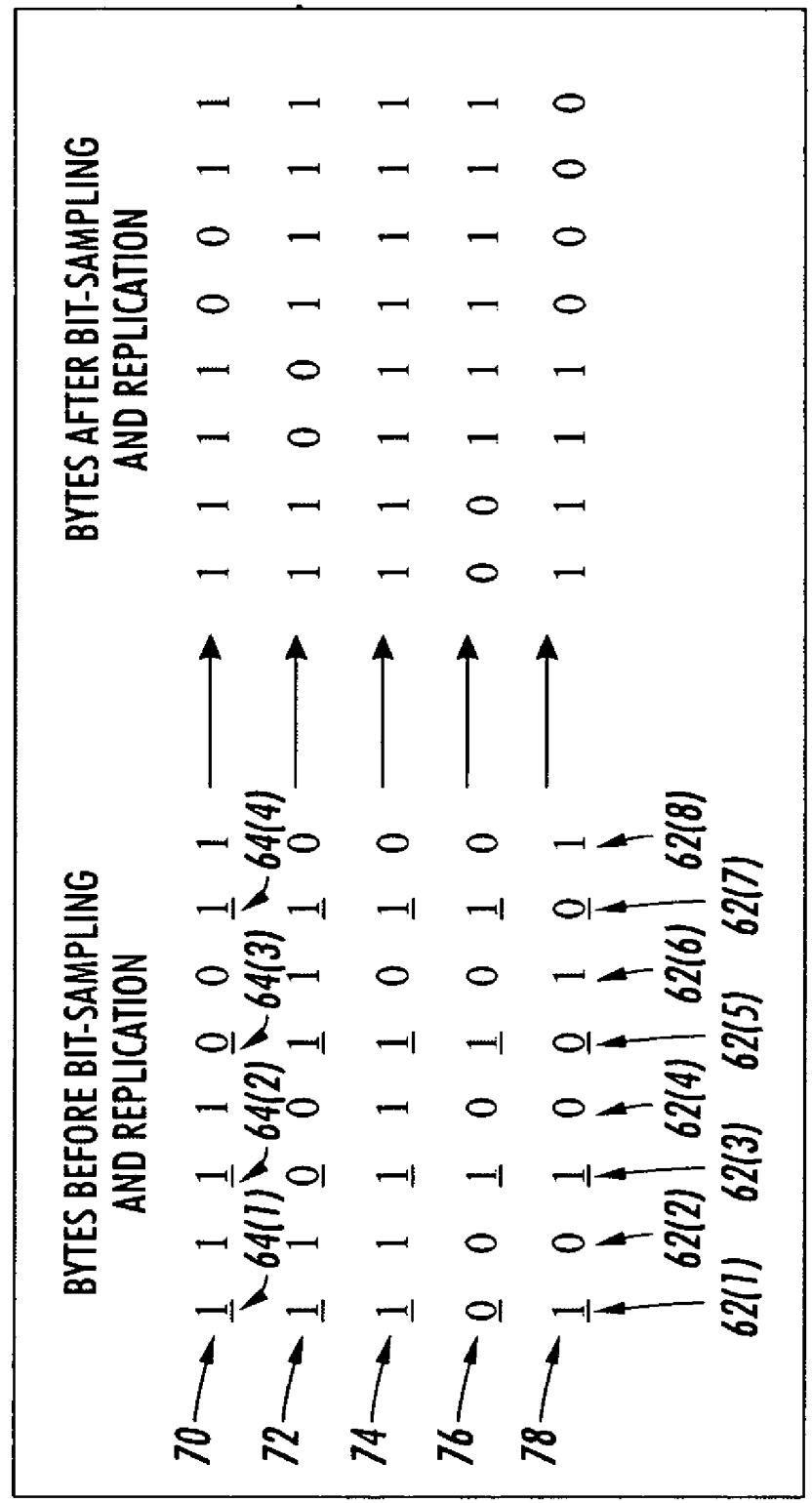
FIG. 4 illustrates the structure of the bit modifications in the bit-sampling and replication process.

Referring to FIGS. 2-4, a method is illustrated for achieving target compression ratios using selective bit-sampling and replication. In FIG. 2, at step 100, the system 10 performs a compression pass with a commercially available, lossless compression algorithm, such as CCITT, DEFLATE or Lempel-Ziv. These algorithms take advantage of homogeneity in the image to reduce the size of the image data file. This compression pass does not result in image degradation.

At step 102, the system 10 then determines whether a target compression ratio is achieved by comparing the size of the image before and after compression. If the target compression ratio is achieved in step 102 then the compression process is complete and the system 10 stops in step 118.

If the target compression ratio is not achieved in step 102, then in step 104 a first pass is made using 2:1 bit-sampling and replication on selected segments of the image, although other bit-sampling ratios could be used. Bit-sampling is defined as sampling less than every available bit of each selected segment. For example, in 2:1 bit-sampling every other bit/pixel is sampled. Similarly, in 4:1 bit-sampling every fourth bit/pixel is sampled. Pixel replication describes the method of copying the sampled pixel and then using that pixel to replace an existing pixel that is adjacent to the bit-sampled pixel. As an example, in the bit pair 01, bit-sampling and replicating the 0 would result in a modified bit pair 00. Additional homogeneity is introduced into the image by replicating bit-sampled pixels, increasing the compression ratio of the image. Although the method described here operates on byte data, other embodiments that operate on nibbles, bit pairs or multiple bytes, could be implemented. Several embodiments comprise changing bits in the binary image by bit-sampling selected bits and replicating each sampled bit into the next bit position.

Referring to FIG. 3, a possible format for a binary image is illustrated. The image 50 is comprised of pixels distributed in the fast scan or x dimension 58, and in the slow scan or y direction 60. Each pixel is represented by a bit. Eight bits comprise a byte 51(1)-51(8) and 52(1)-52(8). Bytes can be defined in either the fast scan or x dimension 58 such as bytes 51(1)-51(8), or in the slow scan or y direction 60 such as bytes 52(1)-52(8). A scan line 54(1)-54(2) is defined as an entire row 54(1) of bits or an entire column 54(2) of bits in an image. Scan lines 54(1) can be comprised of bytes in the fast scan or x dimension 58 such as bytes 51(1)-51(8), or scan lines 54(2) can be comprised of bytes in the slow scan or y direction 60 such as bytes 52(1)-52(8). In these embodiments, bit-sampling and replication is performed on bytes that are bit-sampled in the fast scan or x direction 58, although the bit-sampling and replication could be performed on other sections of the image 50 in other directions such as in the slow scan or y direction 60.

The technique of sampling every other bit within a given byte and replicating it to the next bit position is illustrated in FIG. 4. Bytes 70, 72, 74, 76 and 78 each contain eight binary pixels 62(1)-62(8). For 2:1 bit-sampling, the bytes 70, 72, 74, 76 and 78 are modified by sampling every other pixel and then replicating the sampled pixel to the next bit position. This process can change from zero to four bits within each byte. For example, bytes are shown in their original form in the left column of FIG. 4. In each example, every other bit in the byte is sampled for replication, as shown by the underlined bits 64(1)-64(4). In the first byte 70, no bits will change because the four bit-sampled bits 64(1)-64(4) already match the adjacent replicated bits. In the second byte 72, only bit 62(8) will change and so on with two, three and four bits changing in byte 74, byte 76 and byte 78 respectively.

The replication of selected adjacent bits generally will improve the compression ratio of a file that is compressed using a lossless binary compression system that relies on runs and/or string matching such as CCITT, DEFLATE or Lempel-Ziv. These compression techniques reduce file sizes, in particular for binary images, by replacing "runs" of the same color or pixel value with a single character followed by a multiplier. The more runs there are and the longer the run sequence, the greater the compression. For example, a string of twenty white pixels could be represented more efficiently as "white"×20 rather than repeating the character for "white" twenty times. The present invention increases the number of runs by bit-sampling pixels and replicating these pixels throughout the image. The greater the number of replications that are performed on the image, the longer the run sequence and the more runs that exist in the image. The increased quantity and length of runs improves the compression ratio of the image, resulting in a smaller image after compression. This improvement will be achieved at the expense of image quality, as each replication operation introduces corruption or loss into the image.

Referring back to FIG. 2, in this first pass 104, only those bytes in which one bit will change are altered, although other arrangements can be used. An example of such a byte in which one bit will change is illustrated by byte 72 in FIG. 4. This introduction of loss by means of the bit-sampling and replication process can be continued for a portion of the image or until all bytes in which one bit will change are altered in the entire image 50. At any time the system 10 may be programmed to determine whether the target compression ratio has been met as in step 106.

If the target compression ratio is not achieved in step 106, then a second pass is made using 2:1 bit-sampling and replication in step 108. In this second pass 108, only those bytes in which one or two bits will change are altered, although other arrangements can be used. An example of a byte in which two bits will change is illustrated by byte 74 in FIG. 4.

In step 110, the system 10 determines whether the target compression ratio is achieved. If the target compression ratio is achieved in step 110, then the compression process is complete and the system stops in step 118.

If the target compression ratio is not achieved in step 110, then in step 112 a third pass is made using 2:1 bit-sampling and replication and altering only those bytes in which one, two or three bits will change, although other arrangements can be used. An example of a byte in which three bits will change is illustrated by byte 76 in FIG. 4.

In step 114, the system 10 determines whether the target compression ratio is achieved. If the target compression ratio is achieved in step 114, then the compression process is complete and the system stops in step 118.

If the target compression ratio is not achieved in step 114, then in step 116 a final pass is made altering those bytes in which one, two, three or four bits will change, although other arrangements can be used. An example of a byte in which four bits will change is illustrated by byte 78 in FIG. 4. At step 118 the system 10 stops.

This method achieves the best possible image quality by performing a series of passes that gradually introduce loss into the image until the target compression ratio is met. While a particular order and number of passes in a certain direction has been described, many other alternatives are possible such as bit-sampling in a different direction, using a greater number of passes, using a different order, or using different bit-sampling and replication ratios than the one described.

Other embodiments of a method for obtaining target compression ratios will now be described. As previously illustrated, the strategy for defining the subsets of data to be operated on during each pass of the bit-sampling and replication software is arbitrary. However, the goal is to alter as few bits as necessary in order to achieve the target compression ratio. Successive passes may be performed if the target ratio is not met, with each successive pass enlarging the area under operation to enable a larger number of bits to be altered. After each pass, the amount of compression achieved will determine whether another pass is required. Each pass will therefore alter more bits and thereby iteratively improve the compression ratio. Finer control of image quality can be achieved by defining different subsets of data for each pass and/or by inserting additional passes.

Figure 5:
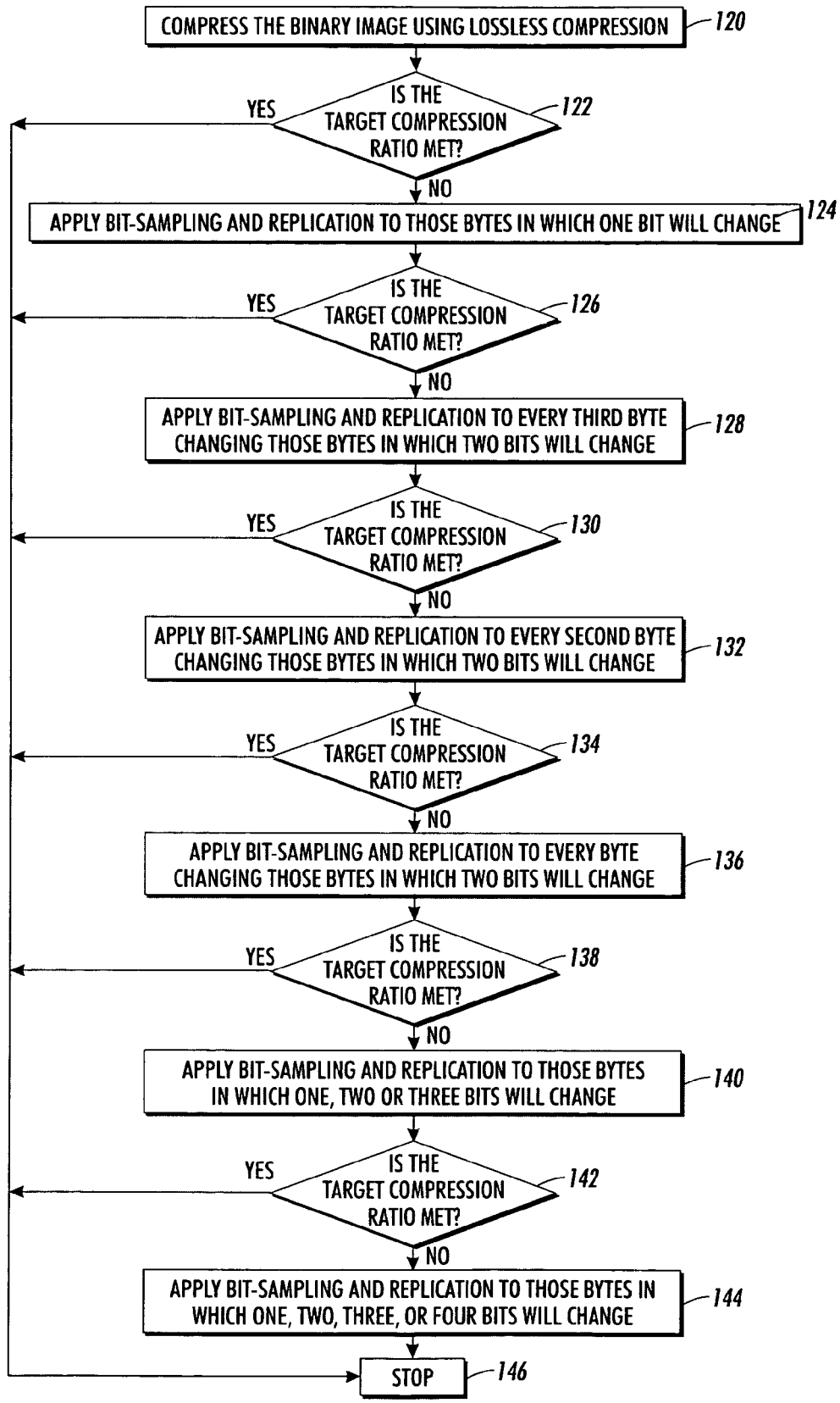
FIG. 5 is a flow chart of a method for selective bit-sampling and replication of binary images using multiple passes and including bit-passes that operate on every Nth byte of data in accordance with embodiments of the present invention.

One such example is described in FIG. 5, in which multiple sub-passes are introduced within one or more of the above passes. In the sub-passes, the bit-sampling and replication function is performed on every Nth byte of data, with N being a pre-selected initial value, while decreasing the value of N on subsequent sub-passes if more compression is needed.

At step 120, the system 10 performs a compression pass with a commercially available, lossless compression algorithm such as CCITT, DEFLATE or Lempel-Ziv. This pass results in no image degradation.

At step 122, the system 10 then determines whether the target compression ratio is achieved by comparing the size of the image before and after compression. If the target compression ratio is achieved in step 122 then the system 10 stops at step 146.

If the target compression ratio is not achieved in step 122, then in step 124 a first pass is made using 2:1 bit-sampling and replication, as described in greater detail with reference to FIGS. 3 and 4. In this first pass 124, only those bytes in which one bit will change are altered. In step 126 the system 10 determines whether the target compression ratio is met. If the target compression ratio is achieved in step 126 then the system 10 stops at step 146.

If the target compression ratio is not achieved in step 126, then a sub-pass is made using 2:1 bit-sampling and replication on every Nth byte within the image 50. The larger the value used for N, the more resulting passes and the more gradual the introduction of loss. By way of example only, N is chosen to equal three, although N could be set to other higher or lower values. In a first sub-pass the system 10 will select every third byte and will alter only those selected bytes in which one or two bits will change 128. In step 130, the system 10 determines whether the target compression ratio is achieved. If the target compression ratio is achieved in step 130 then the system 10 stops at step 146.

If the target compression ratio is not achieved in step 130, then in step 132 the system 10 will select every second byte and will alter only those selected bytes in which one or two bits will change. In step 134, the system 10 determines whether the target compression ratio is achieved. If the target compression ratio is achieved in step 134 then the system 10 stops at step 146.

If the target compression ratio is not achieved in step 134, the system 10 will select every byte and will alter every byte in which one or two bits will change as in step 136. If the target compression ratio is achieved in step 138 then the system 10 stops at step 146.

If the target compression ratio is still not achieved in step 138, then in step 140 a third pass is made altering only those bytes in which one, two or three bits will change. If the target compression ratio is achieved in step 142 then the system 10 stops at step 146.

If the target compression ratio is still not achieved in step 142, then in step 144 a final pass is made altering those bytes in which one, two, three or four bits will change. At step 146 the system 10 stops.

Accordingly, these embodiments use multiple sub-passes between passes one and three to introduce loss at a more gradual rate in order to ensure the best possible image quality for a given target compression ratio. Additional sub-passes could be inserted in or between any of the other existing passes to further refine the introduction of loss. Other values for N could also be used to increase or decrease the number of passes in order to vary the aggressiveness of the approach.

Figure 6:
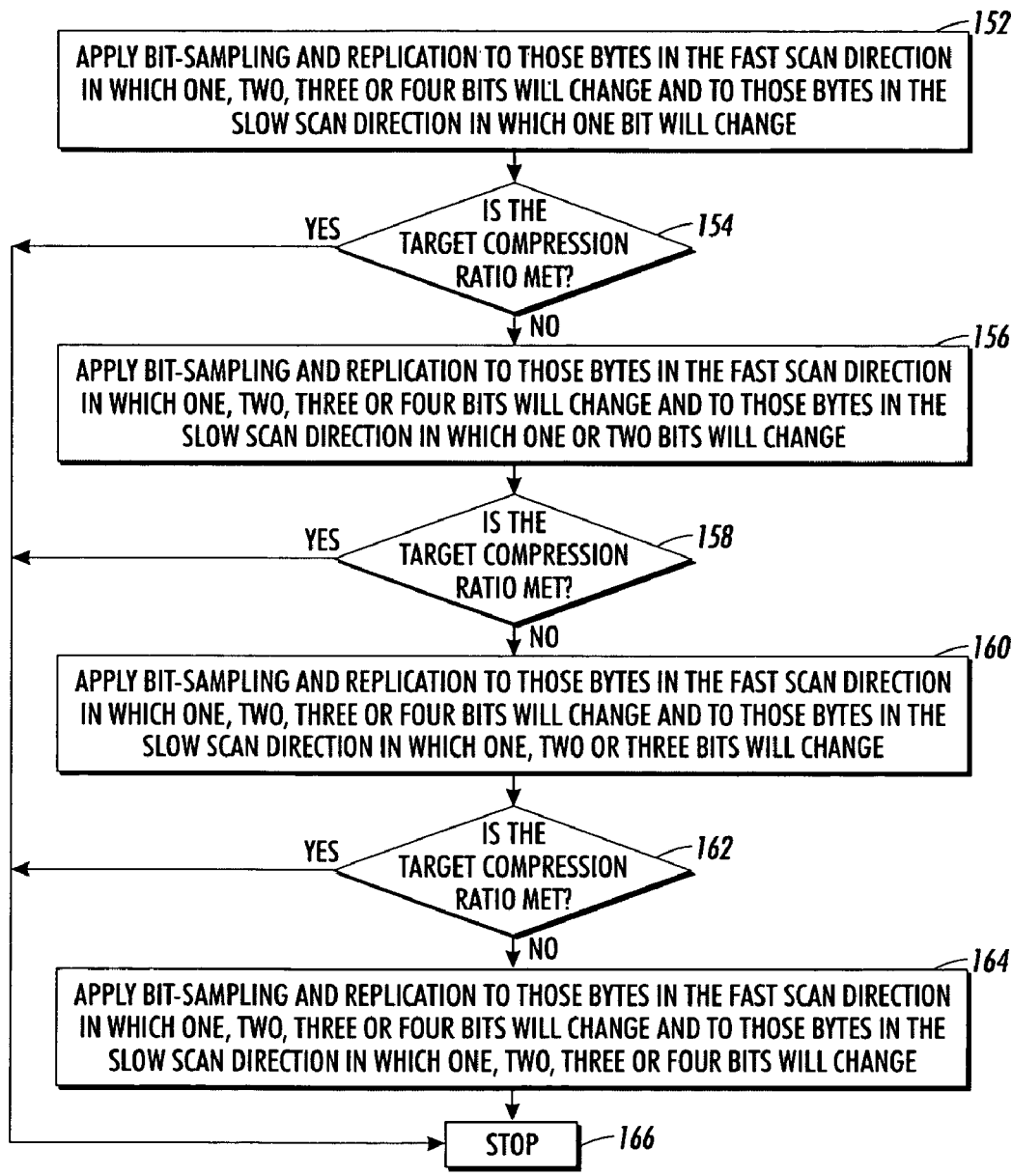
FIG. 6 is a flow chart of a method for selective bit-sampling and replication of binary images using multiple passes in the fast scan direction and additional passes in the slow scan direction in accordance with embodiments of the present invention.

Referring to FIG. 6, other methods in accordance with embodiments of the present invention would extend beyond the fourth pass discussed in FIG. 2 to handle very difficult to compress images. A difficult to compress image is defined in this example as one that is of such complexity that the target compression ratio is not achieved even after completion of four passes in the fast scan or x direction 58. Different numbers of passes may be used to define a difficult to compress image. For such images, additional iterations of bit-sampling and replication on both bytes 51(1) in the fast scan or x direction 58, and on bytes 51(2) in the slow scan or y direction 60 could be used. Referring to FIG. 3, the image 50 can be divided into bytes 51(1)-51(2), scan lines 54(1)-54(8) and 55(1)-55(8), or strips 52(1) and 52(2), each of which can be selected in either the fast scan or x direction 58, or the slow scan or y 60 direction.

Referring to FIG. 6, bit-sampling and replication is performed on bytes first in the fast scan or x direction 58, and then also, if necessary, in the slow scan or y direction 60, although the image 50 could be bit-sampled and replicated in other manners.

If the target compression ratio for the image has still not been achieved after completion of the fourth pass in step 116 of FIG. 2, then the system 10 proceeds to step 152 in FIG. 6. In step 152, the system 10 will apply 2:1 bit-sampling and replication to those bytes in the fast scan or x direction 58 in which one, two, three or four bits will change, followed by bit-sampling and replication of those bytes in the slow scan or y direction 60 in which one bit will change. At step 154 the system 10 determines whether the target compression ratio has been achieved. If it has been achieved, then the system 10 stops at step 166.

If the target compression ratio has not been met in step 154, then in step 156 the system 10 will apply 2:1 bit-sampling and replication to those bytes in the fast scan or x direction 58 in which one, two, three or four bits will change, followed by bit-sampling and replication of those bytes in the slow scan or y direction 60 in which one or two bits will change. If the target compression ratio is achieved in step 158 then the system 10 stops at step 166.

If the target compression ratio has still not been achieved in step 158, then in step 160 the system 10 will apply 2:1 bit-sampling and replication to those bytes in the fast scan or x direction 58 in which one, two, three or four bits will change, followed by bit-sampling and replication of those bytes in the slow scan or y direction 60 in which one, two or three bits will change. If the target compression ratio is achieved in step 162 then the system 10 stops at step 166.

If the target compression ratio has still not been achieved in step 162, then in step 164 the system 10 will apply 2:1 bit-sampling and replication to those bytes in the fast scan or x direction 58 in which one, two, three or four bits will change, followed by bit-sampling and replication of those bytes in the slow scan or y direction 60 in which one, two, three or four bits will change, and the process is complete at step 166. The additional bit-sampling and replication in the slow scan or y direction 60 will enhance the ability to achieve target compression ratios for difficult to compress images. While a particular order has been described, other alternatives are possible such as scanning first in the slow scan or y direction 60 and then scanning in the fast scan or x direction 58, or using multiple alternating passes in either direction.

Figure 7:
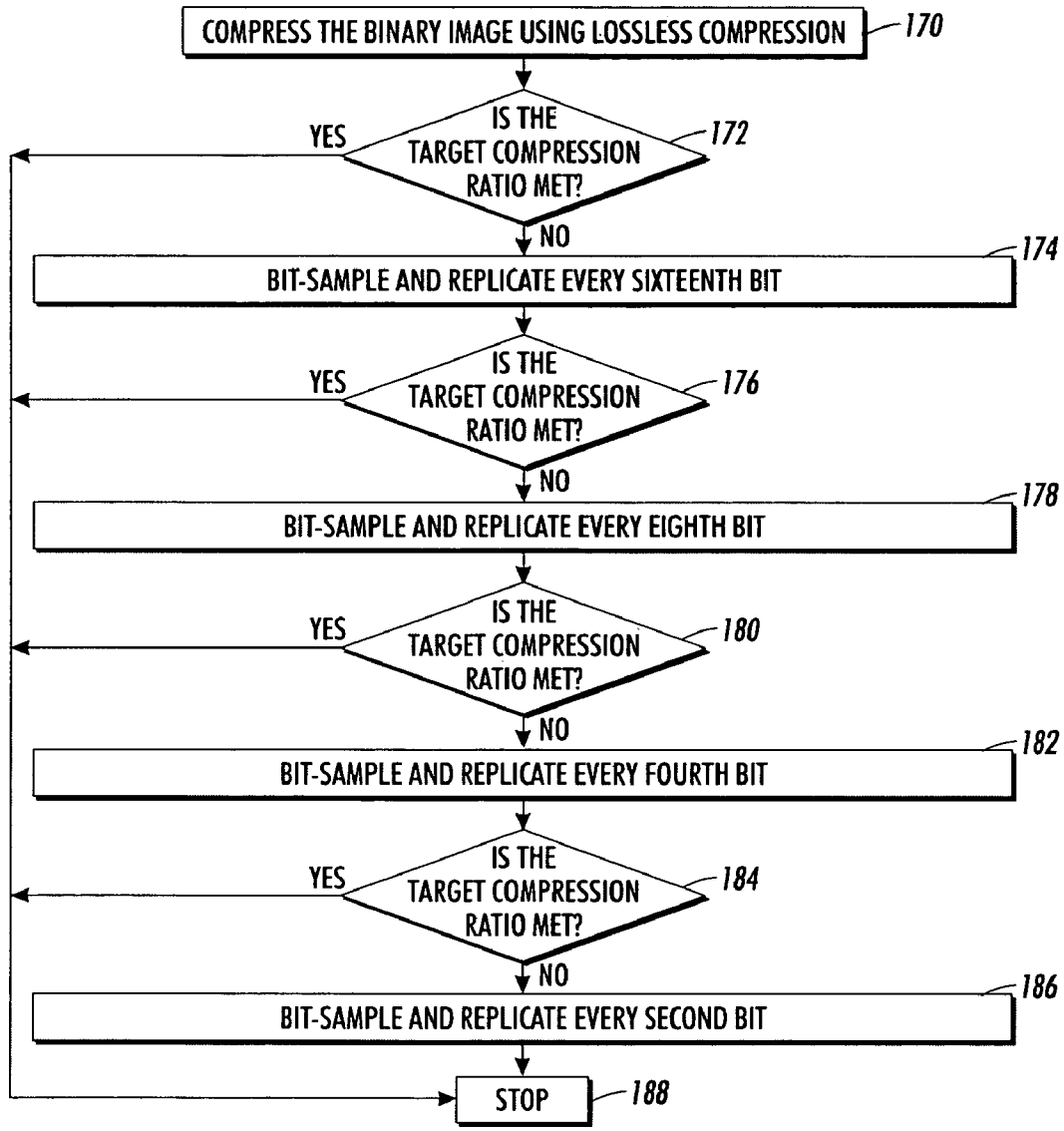
FIG. 7 is a flow chart of a method using multiple passes with different rates of bit-sampling and replication on a binary image in accordance with embodiments of the present invention.

Referring to FIG. 7, other methods that use different bit-sampling ratios can be described in accordance with embodiments of the present invention. At step 170, the system 10 performs a compression pass with a commercially available, lossless compression algorithm such as CCITT, DEFLATE or Lempel-Ziv. This pass results in no image degradation.

At step 172, the system 10 then determines whether the target compression ratio is achieved by comparing the size of the image before and after compression. If the target compression ratio is achieved in step 172, then the compression process is complete and the system 10 stops at step 188.

If the target compression ratio is not achieved in step 172, then in step 174 a first pass is made using 16:1 bit-sampling and replication on the image data. Using 16:1 bit-sampling selects only every sixteenth bit for sampling and replication. After every sixteenth bit is bit-sampled and replicated the system 10 determines whether the target compression ratio is achieved at step 176. If the target compression ratio is achieved in step 176 then the compression process is complete and the system 10 stops at step 188.

If the target compression ratio is not achieved in step 176, the system returns to the beginning of the image and at step 178 a second pass is made using 8:1 bit-sampling and replication. At step 180, the system 10 determines whether the target compression ratio is achieved. If the target compression ratio is achieved in step 180 then the compression process is complete and the system 10 stops at step 188.

If the target compression ratio is not achieved in step 180, the system returns to the beginning of the image and at step 182 a third pass is made using 4:1 bit-sampling and replication. At step 184, the system 10 determines whether the target compression ratio is achieved. If the target compression ratio is achieved in step 184 then the compression process is complete and the system 10 stops at step 188.

If the target compression ratio is not achieved in step 184, the system 10 returns to the beginning of the image and at step 186 a fourth and final pass is made using 2:1 bit-sampling and replication. At step 188 the system 10 stops. While a particular order and number of passes has been described, many other alternatives are possible such as using a greater number of passes, using a different order, or using different bit-sampling and replication ratios than the ones described.

Figure 8:
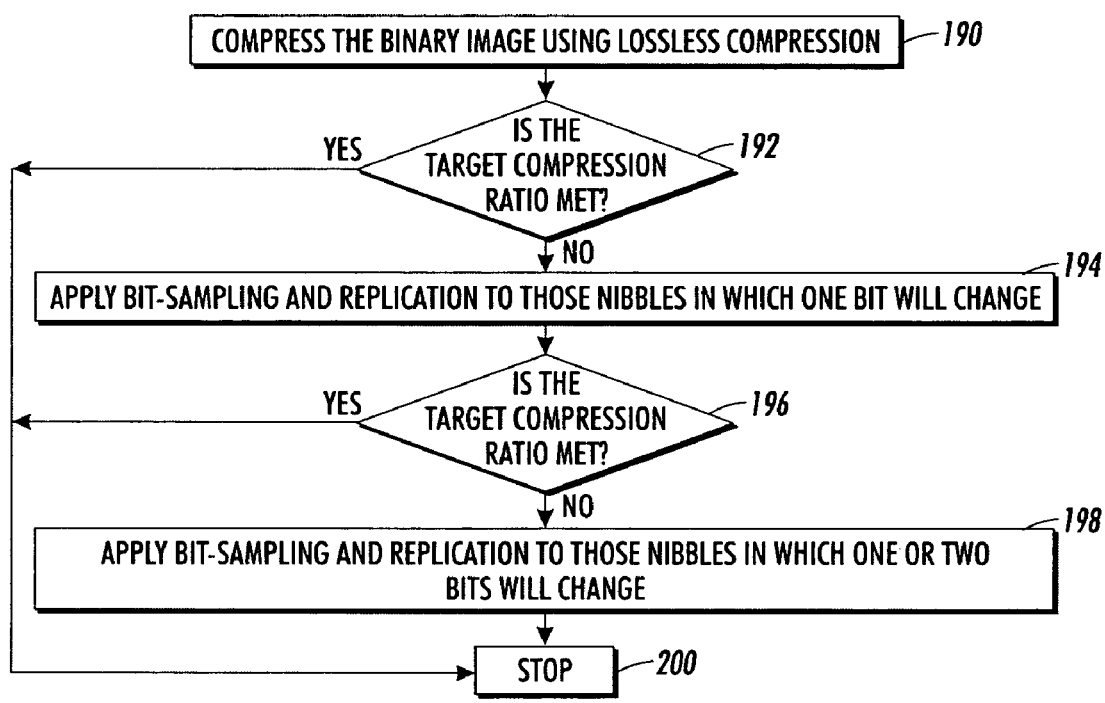
FIG. 8 is a flow chart of a method for selective bit-sampling and replication on nibble data of a binary image in accordance with embodiments of the present invention.

Another method is illustrated in FIG. 8 that operates on nibble data, in accordance with embodiments of the present invention. At step 190, the system 10 performs a compression pass with a commercially available, lossless compression algorithm such as CCITT, DEFLATE or Lempel-Ziv. This pass results in no image degradation.

At step 192, the system 10 then determines whether the target compression ratio is achieved by comparing the size of the image before and after compression. If the target compression ratio is achieved at step 192 then the compression process is complete and the system 10 stops at step 200.

If the target compression ratio is not achieved in step 192, then in step 194 a first pass is made using 2:1 bit-sampling and replication on nibble data. A nibble is a segment that is composed of four bits. In this first pass 194, only those nibbles in which one bit will change are altered. In step 196 the system 10 determines whether the target compression ratio is achieved. If the target compression ratio is achieved in step 196 then the compression process is complete and the system 10 stops at step 200.

If the target compression ratio is not achieved in step 196, then in step 198 those nibbles in which one and two bits will change are altered. After the second pass 198 the system 10 stops 200. The approach using nibble data is more aggressive than an equivalent pass using byte data or multiple-byte data, as more bits will change on each pass.

A less aggressive approach would include bit-sampling and replication on double-byte data instead of single-byte or nibble data. A double-byte is a segment containing 16 bits. This approach would result in eight passes with the first pass changing double-bytes in which one bit will change, the second pass changing double-bytes in which one or two bits will change and so on up to the eighth pass which operates on double-bytes in which eight bits will change. The approach using double-byte data is less aggressive because fewer bits will change on each pass. This approach could result in less image corruption by the time the target compression ratio is met since each pass introduces less loss.

An even less aggressive approach would use bit-sampling and replication on multiple bytes. For example, a multiple byte of any size could be defined such as a multiple byte comprising 4 bytes or 32 bits. Progressively finer granulations could be achieved by operating on four-bytes at a time or successively larger segments.

In embodiments of the present invention, after each pass of bit-sampling and replication the image is compressed to determine if the target compression ratio has been met. If it has been met, the process is stopped. If not, a new pass or iteration is initiated. For passes beyond the first pass, it is the user's option to either return to the original image for subsequent bit sampling and replication, or to use the modified image from the previous pass as a starting point. The compressed image is never used as a starting point for the next bit-sampling and replication pass.

While particular embodiments have been described, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefore, is not intended to limit the claimed processes to any order except as may be specified in the claims.

What is claimed is:

1. A method comprising:
   replacing at least one portion of binary image data with at least one other portion of the binary image data;
   compressing the binary image data; and
   determining whether the compressed binary image data having at least one replaced portion satisfies a target compression ratio,
   wherein the replacing at least one portion of binary image data with at least one other portion of the binary image data further comprises:
      identifying at least one segment within the binary image data, wherein each segment comprises a plurality of bits;
      selecting at least one of the bits in the at least one segment; and
      changing at least one first value of at least one of the bits in the at least one segment to match at least one second value of the at least one selected bit in the segment.

2. The method as set forth in claim 1 further comprising repeating the replacing, the compressing and the determining at least one time.

3. The method as set forth in claim 2 wherein the replacing at least one portion of binary image data is performed on successively larger portions of the binary image data.

4. The method as set forth in claim 1 wherein the at least one segment comprises a plurality of segments and at least one of the plurality of segments is oriented along a first axis in the image data, and at least one other of the plurality of segments is oriented along a second axis in the image data.

5. The method as set forth in claim 1 wherein the compressing is accomplished using a lossless compression algorithm.

6. A system comprising:
   a replacement system that replaces at least one portion of binary image data with at least one other portion of the binary image data;
   a compression system that compresses the binary image data; and
   an assessment system that determines whether the compressed binary image data having at least one replaced portion satisfies a target compression ratio,
   wherein the replacement system that replaces further comprises:
      an identification system that identifies at least one segment within the binary image data, wherein each segment comprises a plurality of bits;
      selection system that selects at least one of the bits in the at least one segment; and
      a changing system that changes at least one first value of at least one of the bits in the at least one segment to match at least one second value of the at least one selected bit in the segment.

7. The system as set forth in claim 6 wherein the replacement system replaces successively larger portions of the binary image data, the compression system compresses successively larger portions of the binary image data and the assessment system assesses successively larger portions of the binary image data.

8. The system as set forth in claim 6 wherein the at least one segment comprises a plurality of segments and at least one of the plurality of segments is oriented along a first axis in the image data and at least one other of the plurality of segments is oriented along a second axis in the image data.

9. The compression system as set forth in claim 6 wherein the compression system uses a lossless compression algorithm.

10. A computer readable medium having stored instructions for achieving a target compression ratio for a binary image which, when executed by a processor, causes the processor to perform steps comprising:
   replacing at least one portion of binary image data with at least one other portion of the binary image data;
   compressing the binary image data; and
   determining whether the compressed binary image data having at least one replaced portion satisfies a target compression ratio,
   wherein the replacing at least one portion of binary image data with at least one other portion of the binary image data further comprises:
      identifying at least one segment within the binary image data, wherein each segment comprises a plurality of bits;
      electing at least one of the bits in the at least one segment; and changing at least one first value of at least one of the bits in the at least one segment to match at least one second value of the at least one selected bit in the segment.

11. The medium as set forth in claim 10 further comprising repeating the replacing, the compressing and the determining at least one time.

12. The medium as set forth in claim 11 wherein the replacing at least one portion of binary image data is performed on successively larger portions of the binary image data.

13. The medium as set forth in claim 10 wherein the at least one segment is oriented along a first axis and a second axis in the image data.

14. The medium as set forth in claim 10 wherein the compressing is accomplished using a lossless compression algorithm.

* * * * *